United States Patent [19]

Heinz et al.

[11] 3,903,079

[45] Sept. 2, 1975

[54] PRODUCTION OF POLYMETHYLENIMINES BY CYCLOAMMONOLYSIS

[75] Inventors: Edward J. Heinz, Kingsville, Tex.; Charles E. Fox, Burlington, Iowa

[73] Assignee: Celanese Corporation, New York, N.Y.

[22] Filed: June 28, 1973

[21] Appl. No.: 374,595

Related U.S. Application Data

[63] Continuation of Ser. No. 175,722, Aug. 27, 1971, abandoned.

[52] U.S. Cl....... 260/239 B; 260/293.51; 260/326.8
[51] Int. Cl.² ............... C07D 207/04; C07D 295/02; C07D 211/12; C07D 211/02

[58] Field of Search..... 260/293.51, 585 B, 268 SY, 260/239 B, 326.8

[56] References Cited
UNITED STATES PATENTS
3,029,240 4/1962 Erner............................ 260/268 SY
3,369,019 2/1968 Hamilton...................... 260/268 SY
3,384,667 5/1968 Hamilton........................... 260/585

FOREIGN PATENTS OR APPLICATIONS
96,518 10/1963 Denmark......................... 260/239 B

OTHER PUBLICATIONS

Chem. Abs. 49, 10312b, (1954), Yu. K. Yurev et al., QD1 A6.

Yu. K. Yurev et al., Chem. Abs. 50, 3393e, (1955), QD1 A6.

*Primary Examiner*—Alton D. Rollins
*Assistant Examiner*—Mark L. Berch
*Attorney, Agent, or Firm*—Stewart N. Rice; Ralph M. Pritchett

[57] ABSTRACT

Process for the cycloammonolysis of disubstituted alkanes which have primary amino and/or hydroxyl substituents to produce heterocyclic imines using a metal aluminosilicate molecular sieve catalyst.

14 Claims, No Drawings

PRODUCTION OF POLYMETHYLENIMINES BY CYCLOAMMONOLYSIS

This is a continuation of application Ser. No. 175,722, filed Aug. 27, 1971, and now abandoned.

BACKGROUND OF THE INVENTION

It has been known that a heterocyclic imine such as hexamethylenimine could be produced by the cyclization and ammonolysis of various compounds using a variety of catalysts. Most of the prior art processes have, however, involved liquid phase ammonolysis which is undesirable in that such processes generally require expensive high-pressure equipment. Further, in vapor phase reactions the production of oligimers is less likely because the reactants are generally more dilute. Thus it is evident that a suitable manner to produce heterocyclic imines in the vapor phase has been needed.

SUMMARY OF THE INVENTION

It is thus an object of the present invention to provide a process for the production of heterocyclic imines. It is a particular object of the present invention to provide a vapor phase process for the production of heterocyclic imines from acyclic compounds. Additional objects will become apparent from the following description of the present invention.

These and other objects are accomplished by the present invention which in one of its aspects is a process for the cycloammonolysis of an acyclic compound of the formula $$A_1—CH_2—(R)—CH_2—A_2$$

wherein $A_1$ and $A_2$ are alike or different and are hydroxyl or primary amino groups, and R is an alkylene group of 2 to 10 carbon atoms and of a configuration such that $A_1$ and $A_2$ are separated by a chain of 4 to 7 carbon atoms, so as to produce a heterocyclic imine of the formula

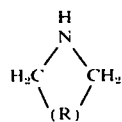
II

R being the same alkylene radical as in said acyclic compound such that said heterocyclic imine contains 4 to 7 carbon atoms in the ring, which process comprises reacting said acyclic compound in the vapor phase with ammonia in the presence of a dehydrated crystalline aluminosilicate molecular seive catalyst.

DESCRIPTION OF THE PREFERRED EMBODIMENTS

The disubstituted acyclic compounds which may be cycloaminated in accordance with the present invention are represented generally by the structural formula I above. These compounds might be characterized broadly as disubstituted alkanes wherein the substituents are hydroxyl and/or primary amino groups. Thus in the above formula I, $A_1$ could be a hydroxyl group and $A_2$ a primary amino group such as in 6-amino-1-hexanol; or both $A_1$ and $A_2$ could be amino groups such as in hexamethylenediamine; or both $A_1$ and $A_2$ could be hydroxyl groups such as in 1, 6-hexanediol. In order to cyclize properly, group $A_1$ and $A_2$ in formula I should be separated by a chain of from 4 to 7 carbon atoms and therefore R must contain at least 2 carbon atoms and can be a substituted or unsubstituted ethylene, n-propylene, n-butylene or n-pentylene radical, that is a substituted or unsubstituted radical of the formula $—CH_2CH_2—$, $—CH_2CH_2CH_2—$, $—CH_2CH_2CH_2 CH_2—$ and $—CH_2CH_2CH_2CH_2CH_2—$. Preferably any substituent on such alkylene radicals are alkyl in nature and are of a size such that the group R in formula I contains no more than 10 carbon atoms. Thus R in above formula I could, for example, be a butyl substituted n-propylene radical of the formula

III

In addition to those already mentioned, specific compounds which may be cycloaminated in accordance with the present invention are 1,4-butanediol, 2-ethyl-1,4-butanediol, 1,4-butanediamine, 1,5-pentanediol, 1,5-pentanediamine, 1-hydroxy-5-amino pentane, 3-pentyl-1,5-pentanediol, 1,7-heptanediol, 1,7-heptanediamine, and 3-hexyl-1,6-hexanediamine. The heterocyclic imines to be produced in accordance with the present invention are represented generally by formula II above and are saturated ring compounds having a 5 to 8 membered ring wherein there is a single nitrogen atom and 4 to 7 carbon atoms in the ring. The carbon atoms non-adjacent the ring nitrogen may be substituted with alkyl radicals depending on the particular acyclic compound from which the heterocyclic imine is produced. The configuration of the imine product will correspond to that obtained by removing the functional groups $A_1$ and $A_2$ of the difunctional acyclic compound of formula I and joining the two ends of the remaining difunctional radical to a single nitrogen atom. Thus either 1,4-butanediol or 1,4-butanediamine will produce tetramethylenimine, also known as pyrrolidine. Likewise an acyclic starting material of formula I wherein R is an alkylene radical as shown in formula III will result in a heterocyclic imine of the formula

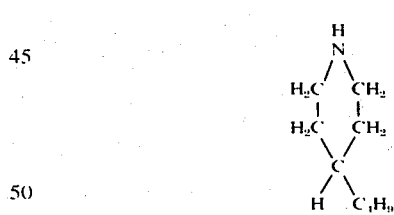

Specific heterocyclic imines which may be produced thus include piperidine, hexamethylenimine, 3-hexyl-hexamethylenimine, 3-methyl piperidine, 2-ethyl pyrrolidine, heptamethylenimine, and the like.

The dehydrated crystalline aluminosilicate molecular seives to be used as a catalyst are well-known in the art for both chemisorption and catalysis. For example, see U.S. Pat. Nos. 3,384,667 to Hamilton and 3,013,982 to Breck, et al. They may be either natural or synthetic and are also known as zeolites or zeolitic molecular seives. They consist basically of three-dimensional frameworks of $SiO_4$ and $AlO_4$ tetrahedra. The tetrahedra are cross-linked by the sharing of oxygen atoms. The electrovalence of the tetrahedra containing aluminum is balanced by the inclusion in the crystal of a cation, for example a metal ion or a hydrogen ion. The spaces between the tetrahedra may be occupied by water or other adsorbate molecules. The zeolitic molecular seives may be activated by driving off substantially all of the water of hydration. It is pointed out that many amorphous, gel-type, aluminosilicates such as those used for water softeners have been described in the literature and those are sometimes referred to as zeolites but are not true zeolites as they are not crystalline in nature.

The naturally occurring zeolitic molecular seives are generally given proper names while the synthetic zeolites are designated by a capital letter which is indicative of its structure. For example type A is used to designate one type of structure of a synthetic zeolite while types X, Y, R, etc., are used to designate those having other structures. In addition to the designation of different crystalline forms of synthetic aluminosilicates by capital letters, numerical prefixes to the capital letters are also used to designate the pore size of the particular material. The number prefix is usually indicative of the pore size in Angstroms although there may be some variance from this. Thus 5X represents a crystalline alumino-silicate having an X type structure and a pore size of about 5 Angstroms. Those used in the present invention as catalysts preferably have pore sizes of at least 3 Angstroms, e.g. 3 to 15 Angstroms, and preferably within the range of 5 to 12 Angstroms.

Since they are well-known and described thoroughly in the prior art, the particular formulas and characteristics of the various crystalline aluminosilicates will not be gone into in detail although they are all of the general formula $$M_{2/n}O.Al_2O_3.xSiO_2.yH_2O$$

IV where M is a cation of n valence, such as a metal, x is the moles of silica and y is the moles of water of hydration. It is characteristic of the crystalline aluminosilicates that the cation M in the above formula IV may be readily replaced by other cations by ion exchange means. Thus if the cation were a metal cation it could be replaced either totally or partially with another metal or hydrogen. Partial replacement would of course result in a zeolite having a mixture of metals or a mixture of a metal or metals and hydrogen. As used herein, the term metal aluminosilicate will be used to designate those in which M in the above formula IV, or at least the major portion thereof, is a metal cation.

Changing the cation will generally affect the activity of a crystalline aluminosilicate as a catalyst although on some types of aluminosilicates the effect is greater than on others. In addition to hydrogen, cations which may be present in the catalysts of the present invention either alone or in mixture with other cations, includes sodium, potassium, lithium, barium, strontium, calcium, magnesium, silver, iron, cobalt, nickel, rubidium, rhodium, palladium, platinum, copper, zinc, cadmium, manganese, molybdenum, and chromium. The preferred catalysts are those crystalline metal aluminosilicates wherein the metal is one or more of copper, palladium, manganese, nickel, or chromium. The amount of metal cation present in the catalysts may vary widely for example from 0.1 to 25% by weight. Best results are, however, obtained with those having less than 10% by weight of the metal cation, 0.3% to 7.0% by weight being an especially suitable amount.

Among the suitable natural crystalline aluminosilicates for use in the present invention are faujasite, analcite, paulingite, ptilolite, clinoptilolite, ferrierite, chabazite, gmelinite, levynite, erionite and mordenite. Suitable synthetic crystalline aluminosilicates useful in the present invention include types Y, B, E, F, G, H, K-G, J, L, M, K-M, Q, R, S, T, U, C, A and X. Types X and Y are preferred.

The crystalline aluminosilicates of the present invention may be employed alone or in combination with various binder or matrix materials. The physical form of the catalyst may also be in various of the conventional forms for catalysts, such as in the form of finely divided particles for use in a slurry or in fluidized bed systems, or in the form of beads, pellets or the like. Suitable binder or matrix materials that may be used include both organic or inorganic materials such as resins, clays, gels and the like. Any matrix or binder should of course be substantially non-catalytic with respect to the particular reaction in which it is employed.

The cycloammonolysis reaction of the present invention is carried out in the vapor phase and the temperature during such should be at least 200° C. as some of the reactants appear to deactivate the catalysts below that temperature. Preferably the temperature is within the range of about 250° C. to 400° C. As temperatures above about 400° C., for example in the range of 450° C. to 500° C., are approached an increasing amount of the heterocyclic imine is caused to dehydrogenate thus resulting in loss of the desired heterocyclic imine product. Of course, if it is desired to dehydrogenate the heterocyclic imine, for example to convert piperidine to pyradine, then the higher temperatures are not as undesirable. The pressure during the cycloammonolysis is preferably kept low since high pressures affect the adsorption-desorption of various products. Pressures within the range of 0.1 to 1.5 atmospheres absolute are quite satisfactory although higher pressures may be utilized, for example pressures within the range of 0.1 to 3.0 atmospheres absolute. Although the reaction time or residence time of the reactants in the reaction zone required for maximum conversion will vary with the reaction conditions and particular reactants, generally the contact times should be within the range of 1 to 45 minutes, preferably 10 to 35 minutes. Use of too low a contact time sometimes results in unwanted dimers in the final product.

The charge of reactants to the cycloammonolysis reactor should be such that the mole ratio of ammonia to the difunctional acyclic compound of formula I above is at least 2:1, for example within the range of 2:1 to 200:1. Preferably the mole ratio of ammonia to acyclic compound is above about 8:1 with the best results being obtained with the range of 15:1 to 30:1. Higher ammonia to organic ratios tend to limit the formation of byproducts. In addition to the ammonia and the difunctional acyclic compound to be cyclized, other compounds may be present in the charge without undue effects. Examples of such other compounds include nitrogen, hydrogen, and water.

The following examples are given to illustrate specific embodiments of the present invention.

EXAMPLE I

In order to produce hexamethylenimine, several runs were made wherein 1,6-hexanediol was cycloaminated in the vapor phase using crystalline metal aluminosilicate catalysts. In each of the runs 100 cubic centimeters of catalyst was charged to a glass reactor, the reaction mixture preheated to the desired temperature and passed over the catalyst. After allowing the system to stabilize for at least two hours, the effluent from the reactor was condensed, sampled and analyzed by gas chromotography. In each of the runs the charge to the reactor consisted of ammonia, 1,6-hexanediol and hydrogen in the mole ratio of 9:1:0.5 respectively. The volume hour space velocity (volume of feed per hour per volume of catalyst) was 600 hr.$^{-1}$ in each run. The following Table I shows the details of each of the runs and the concentration of hexamethylenimine (HMI) in the product.

TABLE I

| Run No. | Catalyst Metal Concentration, wt % | Structure, Type | Pore Size, A° | Reaction Conditions Pressure, atm.abs. | Temp., °C | Product wt % HMI |
|---|---|---|---|---|---|---|
| 1 | 1% Cu | Y | 8 | 1.5 | 304 | 46.1% |
| 2 | 1% Cu | X | 8 | 1.5 | 295 | 25.1% |
| 3 | 0.5% Pd | Y | | 1.5 | 300 | 42.2% |
| 4 | 10% Ru | X | 8 | 1.0 | 293 | 27.0% |
| 5 | 20% Mn | X | 8 | 1.0 | 303 | 40.8% |
| 6 | 1% Ni | Y | 8 | 1.0 | 297 | 54.6% |
| 7 | 20% Ag | X | 10 | 1.0 | 300 | 31.7% |
| 8 | 20% Zn | X | 8 | 1.0 | 302 | 14.8% |
| 9* | 1% Cu | Y | 8 | 1.0 | 350 | 57.3% |
| 10 | 0.5% Cr 0.5% Mn | Y | 10 | 1.5 | 297 | 32.0% |
| 11 | Na | X | 10 | 1.5 | 303 | 17.0% |
| 12 | 1% Cu | Mordenite | 7 | 1.0 | 300 | 11.0% |

*Ratio of ammonia to feed of 30:1

EXAMPLE II

In order to convert hexamethylenediamine to hexamethylenimine, a mixture of ammonia and hexamethylenediamine was preheated to about 280° C. and passed at atmospheric pressure over 50 cubic centimeters of catalyst consisting of a type Y zeolite having a pore size of 8 Angstroms and containing 1% by weight of copper therein. The liquid hourly space velocity (volume of hexamethylenediamine liquid fed per hour per volume of catalyst) was 0.16 hr.$^{-1}$ and the flow of ammonia was 0.02 moles per minute. After allowing the system to stabilize a sample was collected from the reactor effluent and analyzed by gas chromotography, the analysis showing the product to contain about 77.67 weight per cent of hexamethylenimine.

EXAMPLE III

The procedure of Example II was repeated except that the starting material consisted of 1,5-pentanediol and the temperature was 250° C. Analysis of the product showed it to contain about 75% by weight of piperidine.

EXAMPLE IV

The procedure of Example II was repeated except that the temperature was 300° C. and starting material consisted of a purge stream from a distillation tower containing by weight about 30% 6-aminohexanol, 15% 1,6-hexanediol and 55% of various nitrogen compounds which were not precursors for hexamethylenimine. The product contained by weight about 32.0% hexamethylenimine, 1.35% 6-aminohexanol and 4.7% 1,6-hexanediol. The analysis indicated that about 60% of the 6-aminohexanol and 1,6-hexanediol had been converted to the hexamethylenimine.

The embodiments of the invention in which an exclusive property or privilege is claimed are defined as follows:

1. A process for the cycloammonolysis of an acyclic compound of the formula $$A_1\text{-}CH_2\text{-}(R)\text{-}CH_2\text{-}A_2$$

wherein $A_1$ and $A_2$ are alike or different and are hydroxyl or primary amino groups, and R is an alkylene group of 2 to 10 carbon atoms and of a configuration such that $A_1$ and $A_2$ are separated by a chain of 4 to 7 carbon atoms, so as to produce a heterocyclic imine of the formula

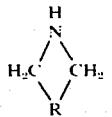

R being the same alkylene radical as in said acyclic compound such that said heterocyclic imine contains 4 to 7 carbon atoms in the ring, which process comprises reacting said acyclic compound in the vapor phase with ammonia at a temperature of 250°C to 400°C and at a pressure of 0.1 to 1.5 atmospheres absolute in the presence of a dehydrated crystalline metal aluminosilicate molecular sieve catalyst, the mole ratio of ammonia to said acyclic compound being within the range of 15:1 to 30:1 and the residence time of the reactants in the reaction zone being within the range of 10 to 35 minutes.

2. The process of claim 1 wherein said alkylene radical is a straight chain butylene radical such that the heterocyclic imine produced is hexamethylenimine.

3. The process of claim 1 wherein said alkylene radical is a straight chain propylene radical such that the heterocyclic imine produced is piperidine.

4. The process of claim 1 wherein said catalyst is a dehydrated crystalline metal aluminosilicate wherein the metal cation of said aluminosilicate is one or more of copper, palladium, manganese, nickel or chromium.

5. The process of claim 1 wherein said dehydrated crystalline aluminosilicate molecular sieve is a type X or a type Y molecular sieve.

6. The process of claim 1 wherein said heterocyclic imine is hexamethylenimine, and wherein said dehydrated crystalline metal aluminosilicate molecular sieve catalyst is a type X or type Y molecular sieve having a pore size within the range of 5 to 12 Angstroms.

7. The process of claim 6 wherein hexamethylenenimine is produced from a mixture comprising 6-aminohexanol and 1,6 hexanediol.

8. The process of claim 6 wherein the metal cation of said catalyst is one or more of copper, palladium, manganese, nickel or chromium, the metal cation being present in said catalyst in amounts of from about 0.3 to 7.0% by weight.

9. The process of claim 8 wherein said catalyst is a type X or a type Y molecular sieve.

10. A process for converting hexamethylenediamine to hexamethylenimine, which process comprises contacting hexamethylenediamine and ammonia, in the vapor phase in a reaction zone maintained at a temperature of 250°C to 400°C at a pressure of 0.1 to 1.5 atmospheres absolute, with a dehydrated crystalline metal aluminosilicate molecular sieve catalyst, the mole ratio of ammonia to hexamethylenediamine being in the range of 15:1 to 30:1 and the residence time of the reactants in the reaction zone being 10 to 35 minutes.

11. The process of claim 10 wherein the metal cation of said aluminosilicate is one or more of the group consisting of copper, palladium, manganese, nickel, and chromium.

12. The process of claim 10 wherein said catalyst is a type X or type Y molecular sieve.

13. The process of claim 10 wherein the catalyst has a pore size within the range of 5 to 12 Angstroms.

14. The process of claim 12 wherein the metal cation of said catalyst is present in said catalyst in an amount of from about 0.3 to 7.0% by weight.

* * * * *

UNITED STATES PATENT OFFICE
CERTIFICATE OF CORRECTION

PATENT NO. : 3,903,079
DATED : September 2, 1975
INVENTOR(S) : E. J. Heinz and C. E. Fox It is certified that error appears in the above-identified patent and that said Letters Patent are hereby corrected as shown below:

In column 1, line 31, after the type formula there set forth, insert -- I --.

Signed and Sealed this twenty-fifth Day of November 1975

[SEAL]

Attest:

RUTH C. MASON
Attesting Officer

C. MARSHALL DANN
Commissioner of Patents and Trademarks